United States Patent [19]
Bennett

[11] Patent Number: 5,861,093
[45] Date of Patent: Jan. 19, 1999

[54] SERPENTINE FLOWPATH FILTRATION APPARATUS WITH HORIZONTALLY MOUNTED FILTERS HAVING HANDLES TO FACILITATE REMOVAL

[76] Inventor: Scott A. Bennett, 7202 Impala Dr., Richmond, Va. 23228

[21] Appl. No.: 779,738

[22] Filed: Jan. 7, 1997

[51] Int. Cl.⁶ .......................... B01D 29/01; B01D 29/56
[52] U.S. Cl. .................. 210/168; 210/171; 210/237; 210/238; 210/195.1; 210/196; 210/416.5; 210/470; 210/241; 210/336
[58] Field of Search .................... 210/336, 335, 210/167, 168, 241, 232, 237, 238, 171, 172, 194, 195.1, 196, 416.1, 416.5, 470, 249

[56] References Cited

U.S. PATENT DOCUMENTS

| | | | |
|---|---|---|---|
| 272,997 | 2/1883 | Woods | 210/336 |
| 671,684 | 4/1901 | Xander | 210/336 |
| 777,159 | 12/1904 | Tunbridge | 210/336 |
| 1,290,820 | 1/1919 | Winkel . | |
| 1,738,521 | 12/1929 | Bomhoff | 210/336 |
| 1,743,524 | 1/1930 | Cabrera | 210/336 |
| 1,908,329 | 5/1933 | Dunham . | |
| 2,288,333 | 6/1942 | Vinson | 210/336 |
| 2,359,985 | 10/1944 | Gordon | 210/336 |
| 3,469,702 | 9/1969 | Perren | 210/336 |
| 3,483,984 | 12/1969 | Wolkenhauer | 210/336 |
| 3,957,634 | 5/1976 | Orensten et al. . | |
| 4,659,485 | 4/1987 | Arbisi et al. | 210/758 |
| 4,818,388 | 4/1989 | Morioka et al. | 210/167 |
| 5,160,444 | 11/1992 | McFarland | 210/805 |
| 5,368,753 | 11/1994 | Gardenier, Jr. | 210/800 |
| 5,451,317 | 9/1995 | Ishida et al. | 210/332 |

FOREIGN PATENT DOCUMENTS

| | | |
|---|---|---|
| 4-180802(A) | 6/1992 | Japan . |
| 1733045(A1) | 5/1992 | U.S.S.R. . |

Primary Examiner—Robert J. Popovics
Attorney, Agent, or Firm—Richard C. Litman

[57] ABSTRACT

An apparatus for filtering and cooling liquid, with four filtration chambers are connected by a series of passageways. The apparatus is mounted on a cart so that it may be rolled into position under a machine quickly and easily. Once the apparatus is in position, the machine is drained of its debris-laden oil which flows directly into the first chamber and through the first wire mesh filter. The liquid is then forced either by gravity or by pressure through the remaining chambers and their respective filters which have progressively smaller pore sizes. The tortuous movement of the liquid around the weirs helps to cool the liquid while the filters remove foreign particles from the liquid. Once the liquid reaches the fourth chamber, a pump is used to pump the cleansed liquid back into the machine so that it may be reused. The inlet to the pump may be fitted with an optional fifth filter element. Each chamber houses a tray assembly which includes a handle that protrudes above the chamber, a bracket that hold the replaceable wire mesh filters, and a catch pan that collects any solids that have settled to the bottom of each chamber. The filters have gaskets to prevent fluids from by-passing the filters and the filter pore size can vary with the application. The first embodiment may be operated at atmospheric pressure, while a second embodiment is equipped with a top on the tank which allows the system to be pressurized.

17 Claims, 5 Drawing Sheets

SERPENTINE FLOWPATH FILTRATION APPARATUS WITH HORIZONTALLY MOUNTED FILTERS HAVING HANDLES TO FACILITATE REMOVAL

BACKGROUND OF THE INVENTION

1. Field of the Invention

The present invention relates generally to an apparatus for filtering solid impurities carried by a liquid. More particularly, the present invention relates to an apparatus for removing various sized debris from the machine oil of a piece of machinery. The present invention also relates to an apparatus for cooling the machine oil while removing the debris therefrom.

2. Description of the Prior Art

Machinery which has moving parts or cutting tools requires a lubricant to protect against damage and lengthen the useful life of components, e.g., moving parts or cutting tools. However, continuous usage of the machinery causes wear of the moving parts and cutting tools, which causes debris particles to become suspended within the lubricant. As more debris becomes suspended within the lubricant, continued use of the lubricant may actually cause more damage to the machinery than it can prevent. It is necessary, therefore, to filter the lubricant for continued usage or to completely change the lubricant periodically. Obviously, complete replacement of the lubricant is preferable because all debris is removed from the machinery. However, complete periodic or scheduled replacement is an extremely costly program to implement, and oftentimes the benefits are not significant enough to justify the costs.

Recycling the lubricant through periodic filtering, therefore, is a highly cost effective approach for maintaining the useful life of machinery and various machine parts.

The operating temperature of the machinery and the lubricating oil is typically high which can cause thermal breakdown of the oil. Once thermal breakdown of the oil occurs, the oil can no longer function as an effective lubricant. Therefore, cooling of the oil during the filtration process will help to extend the useful life of the oil.

Various filtering devices for removing solid matter suspended in a liquid are well known in the prior art.

U.S. Pat. No. 1,290,820 issued to H. Ten Winkel. on Jan. 7, 1919, describes a device for removing impurities from oil and water, and separating the oil from the water. The device comprises three distinct separating chambers that utilize different filter arrangements to accomplish the desired effect. In one of the separating chambers, the liquid follows a tortuous path which carries it into an internal compartment from the bottom thereof, and upwardly through three screens where it overflows into an outlet pipe that may carry the liquid to a final separating chamber. The final separating chamber requires the tortuous passage of water, forced under the manometric pressure of incoming liquid, to flow through a bottom opening into a series of annular compartments which lead to a pure water discharge tube. The density differences between oil and water allow the water to enter the bottom opening and flow out the discharge tube while the oil floats upwards away from the bottom opening. No suggestion is made for using the above-described liquid flow for the purpose of causing suspended debris to settle, nor is any suggestion made for using the liquid flow to cause cooling of the liquid.

U.S. Pat. No. 5,160,444 issued to George E. McFarland on Nov. 3, 1992, describes an apparatus mounted on a cart and used for filtering food debris from cooking oil. The apparatus uses a closed system that is pressurized by a pump to force cooking oil through a plurality of lines and filter assemblies. Each filter assembly includes an outer fluid chamber located between a sleeve and a filter within the sleeve, and an inner passageway internal to the filter. Fluid is forced into the outer chamber and through the filter to the inner chamber, where it is forced into another filter or returned to a cooker for use. No suggestion is made for using the above-described liquid flow to cause cooling of the liquid. Additionally, the apparatus described is a closed system which requires the use of a pump to force the liquid through the system and also requires significant bleeding operation, which makes the apparatus labor intensive to operate.

U.S. Pat. No. 3,957,634 issued to Henry E. Orensten and Vivian C. Orensten on May 18, 1976, describes various filtering elements within a closed system, pump-fed aquarium filter. The aquarium filter comprises a plurality of chambers with a cylindrical filtering element in each chamber. Fluid enters each chamber through an inlet at one end, where it passes through the filtering element and into a passageway internal to the element which communicates with an outlet at the other end of the chamber. Fluid is forced through a first filtering element, and then the fluid flow is divided into parallel flow through one of two additional filtering elements, i.e., a fine filtering element, a chemical filtering element, or a biologically active filtering element. The flow of fluid through the aquarium filter causes tortuous movement of the water through the series-parallel arrangement of filtering elements. No suggestion is made for using the above-described liquid flow to cause cooling of the liquid. Nor is any suggestion made for mounting this device atop a transportable cart to afford the apparatus maneuverability within the limited space typical of many machinery environments, so that it could be positioned to address a machine on a periodic basis.

U.S. Pat. No. 4,659,485 which issued to Dominic S. Arbisi and Thomas A. Rasmussen on Apr. 27, 1987, describes a method and apparatus for aerating flowing water. The apparatus includes a plurality of serially arranged chambers which contain baffles open along their bottom edge to create tortuous water flow within each chamber, i.e., vertically downward and upward. Separating each chamber are partitions which are arranged to allow water to cascade down to the adjacent downstream chamber. The gravity fed apparatus is an open system which provides for cascading movement of the fluid, and nozzles which introduce air to the vertically downward flow of water within each chamber to cause the desired aeration. No suggestion is made for using the above-described liquid flow for the purpose of causing suspended debris to settle, nor is any suggestion made for using the liquid flow to cause cooling of the liquid.

U.S. Pat. No. 1,908,329 issued to Sidney R. Dunham on May 9, 1933, describes a filtering device for use in closed system. The filtering device utilizes a number of filtering screens aligned in series, whereby debris is stopped by the filtering screens. Each filter screen is provided within an opening to allow liquid flow to continue even when a filtering screen becomes clogged. The openings of adjacent filtering screens are offset so as to cause tortuous fluid travel through the filtering device, which allows debris to settle despite clogging of the screens. No suggestion is made for using the above-described liquid flow to cause cooling of the liquid. Nor is there any suggestion made for mounting this device atop a transportable cart to provide maneuverability to the apparatus within the limited space typical of many machinery environments, so that it may be positioned to service a machine on a periodic basis.

U.S. Pat. No. 5,368,753 issued to Ransen Gardenier, Jr., on Nov. 29, 1994, describes an antifreeze reclamation apparatus and a process for reclaiming antifreeze. The apparatus utilizes a gravity fed system with an inlet elevated above the outlet, whereby introduction of additional liquid forces cleaned liquid from the outlet. The process depends upon sedimentation to remove suspended debris and filtration by anionic and cationic resins, at the outlet or within the chamber, to remove dissolved minerals and metals.. No suggestion is made for using the above-described liquid flow to cause cooling of the liquid. Nor is there any suggestion made for mounting this device atop a transportable cart to afford the apparatus maneuverability within the limited space typical of many machinery environments so that it may be positioned to address a machine on a periodic basis.

U.S. Pat. No. 4,818,388 issued to Koji Morioka et al. on Apr. 4, 1989, describes a device for collecting and separating paint waste floating in cleaning water for a paint spraying booth and circulating the refined cleaning water. The device includes a series of tanks that are separated by weirs which causes a bubbling effect that allows the paint waste to float and flow over the weirs and into the next lower tank. The waste paint is then collected and the refined cleaning water is then circulated to be reused as cleaning water. No suggestion is made for using the abovedescribed liquid flow to cause cooling of the liquid.

U.S. Pat. No. 5,451,317 issued to Hiroshi Ishida et al. on Sep. 19, 1995, describes a solid-liquid separator for sludge which includes a pair of pumps disposed in a tank for establishing a horizontal flow therein through a plurality of stages of sequentially arranged submerged filter systems. Solid material is separated from the liquid medium as the material flows horizontally through the faces of the individual filter membranes. No suggestion is made for using the above-described liquid flow to cause cooling of the liquid. Nor is there any suggestion made for mounting this device on a transportable cart to afford the apparatus maneuverability within the limited space typical of many machinery environments so that it may be positioned to service a machine on a periodic basis.

Soviet Union Patent Application Number 1,733,045 (A1) published on May 15, 1992, describes a suspended particle collector which includes a tank-pit having first and second purification stages. No suggestion is made for using the above-described liquid flow to cause cooling of the liquid.

Japanese Patent Application Number 4-180,802 (A), published on Jun. 29, 1992, describes an oil and water separation device which includes a series of separation tanks each containing a filter and each being separated by a partition wall. No suggestion is made for using the above-described liquid flow to cause cooling of the liquid.

None of the above inventions and patents, taken either singly or in combination, is seen to describe the instant invention as claimed.

SUMMARY OF THE INVENTION

The present invention is an apparatus for filtering and cooling liquid which includes four filtration chambers that are connected by a series of passageways. The apparatus is mounted on a cart so that it may be rolled into position under a machine quickly and easily. Once the apparatus is in position underneath the machine, the machine is drained of its debris-laden oil which then flows directly into the first chamber and through the first wire mesh filter. In addition to use for periodic filtering of the oil, the apparatus may also be used for continuous filtering of the oil during use of a machine. In either case, after oil is introduced into the first chamber, the liquid is then forced by gravity under a weir, up into a second chamber where it travels through a second filter with smaller pores than the first filter. The liquid then travels over a second weir into the third chamber and through another filter with even smaller pores. Finally, the liquid travels under a third weir into the last chamber where it travels through another filter with even smaller pores.

The tortuous movement of the liquid around the weirs helps to cool the liquid while the filters remove foreign particles from the liquid. Once the liquid reaches the fourth chamber, a pump is used to pump the cleansed liquid back into the machine so that it may be reused. The inlet to the pump may be fitted with an optional fifth filter element. Any overflow liquid is stored in an overflow tank which is also mounted on the cart.

Each chamber houses a removable filter and collection unit which includes a handle that protrudes above the chamber, a bracket that holds the replaceable wire mesh filters, and a tray that collects any solids that have settled to the bottom of each chamber. The filters have gaskets to prevent fluids from bypassing the filters and the filter pore size can vary with the application.

The entire unit is designed to roll under or up to a machine or tank. The inlet side of the pump is equipped with a valve to isolate the pump and to vary the flow rate of the fluid back to the machine or tank. The first embodiment of the present invention may be operated at atmospheric pressure, while a second embodiment is equipped with a top on the tank which allows the system to be pressurized. In the pressurized system no overflow tank would be used.

Accordingly, it is a principal object of the invention to provide a novel and useful filtration apparatus used for removing debris in machine oil, thereby increasing the useful life of the piece of machinery.

It is another object of the invention to provide an apparatus which utilizes the liquid flow for the purpose of causing suspended debris to settle.

It is a further object of the invention to provide an apparatus which utilizes the liquid flow to cause cooling of the liquid.

Still another object of the invention is to provide an apparatus which can substantially extend the useful life of machine oil by removing entrained debris on a periodic basis through mechanical filtering means.

A further object of the invention is to provide an apparatus which is oriented to reside atop a transportable cart to afford the apparatus maneuverability within the limited space typical of many machinery environments to service a machine on a periodic basiLs and thereafter be returned to a storage area.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
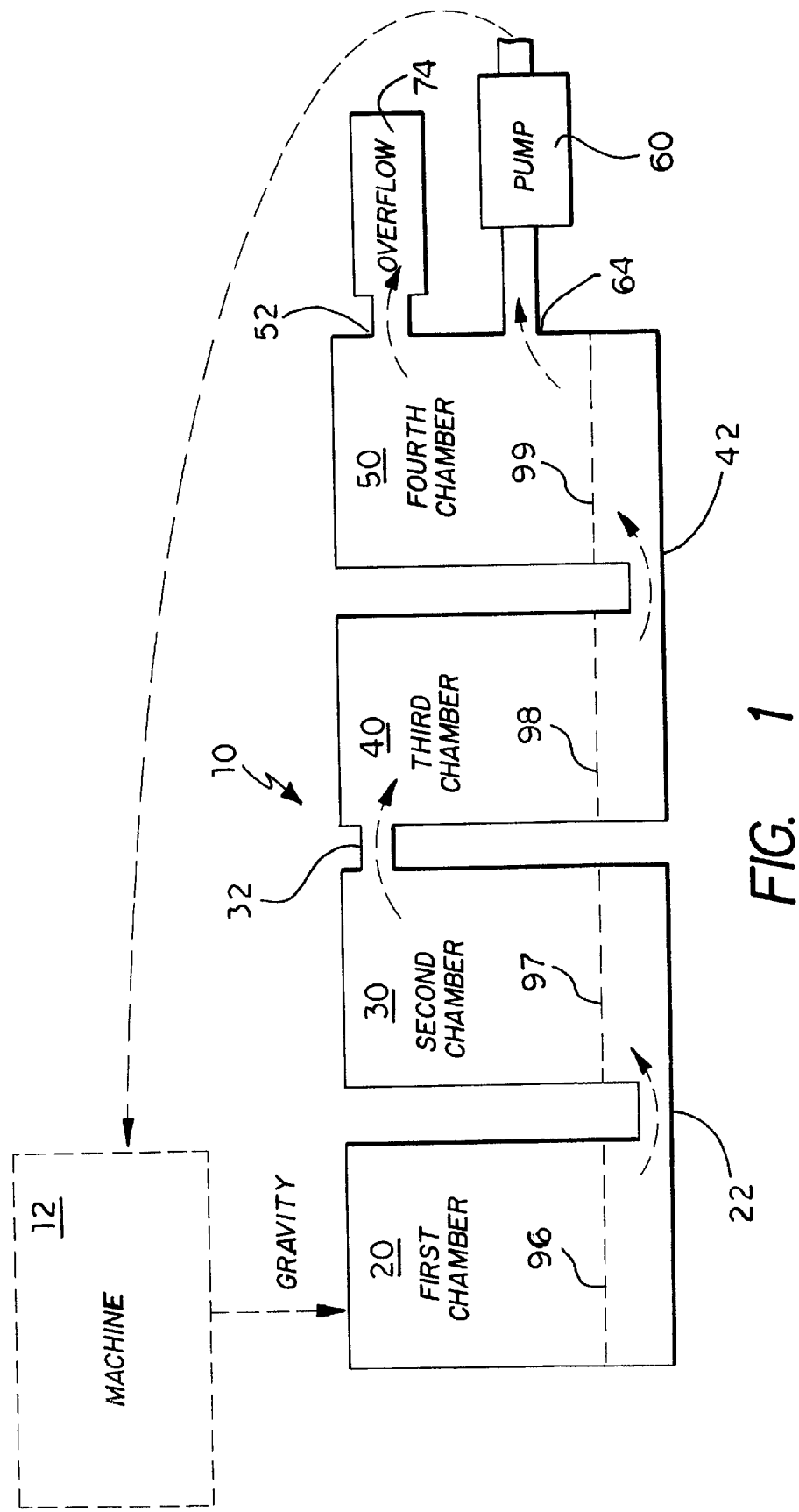
FIG. 1 is a block diagram of an apparatus for filtering and cooling liquid according to the present invention.

Referring now to the figures by numerals of reference and first to FIG. 1, 10 denotes generally an apparatus for filtering and cooling liquid according to the present invention. FIG. 1 is a block diagram of an apparatus 10 for filtering and cooling liquid which includes four filtration chambers, 20, 30, 40, and 50, that are connected by a series of passageways, 22, 32, and 42. The passageways, 22, 32, and 42, are defined by three weirs, 24, 34, and 44. Each chamber houses a removable filter and collection unit 80 which includes a handle 84, a collection tray 86, a bracket 88, and a removable filter assembly 90.

Figure 2:
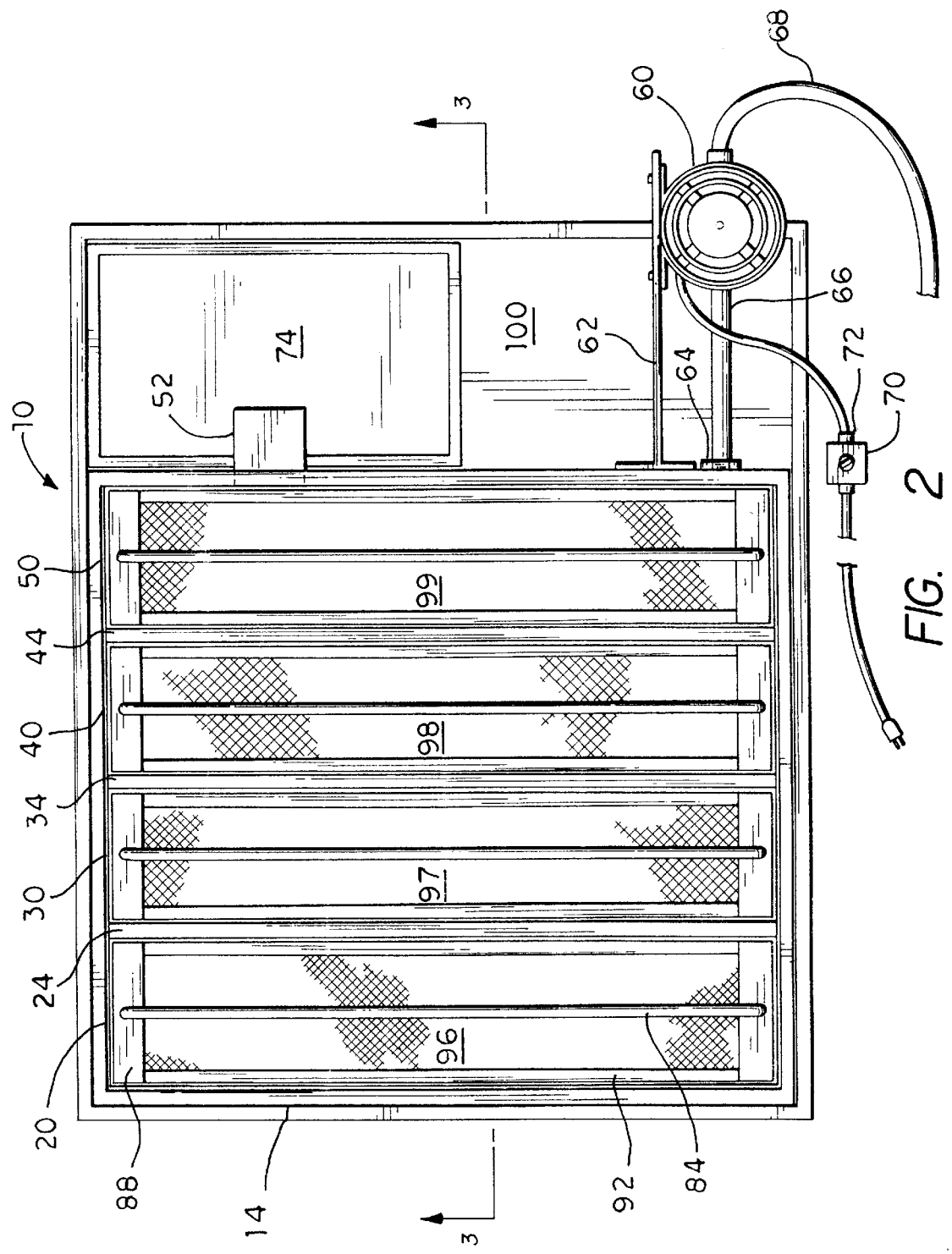
FIG. 2 is a top plan view of an apparatus for filtering and cooling liquid.
Figure 3:
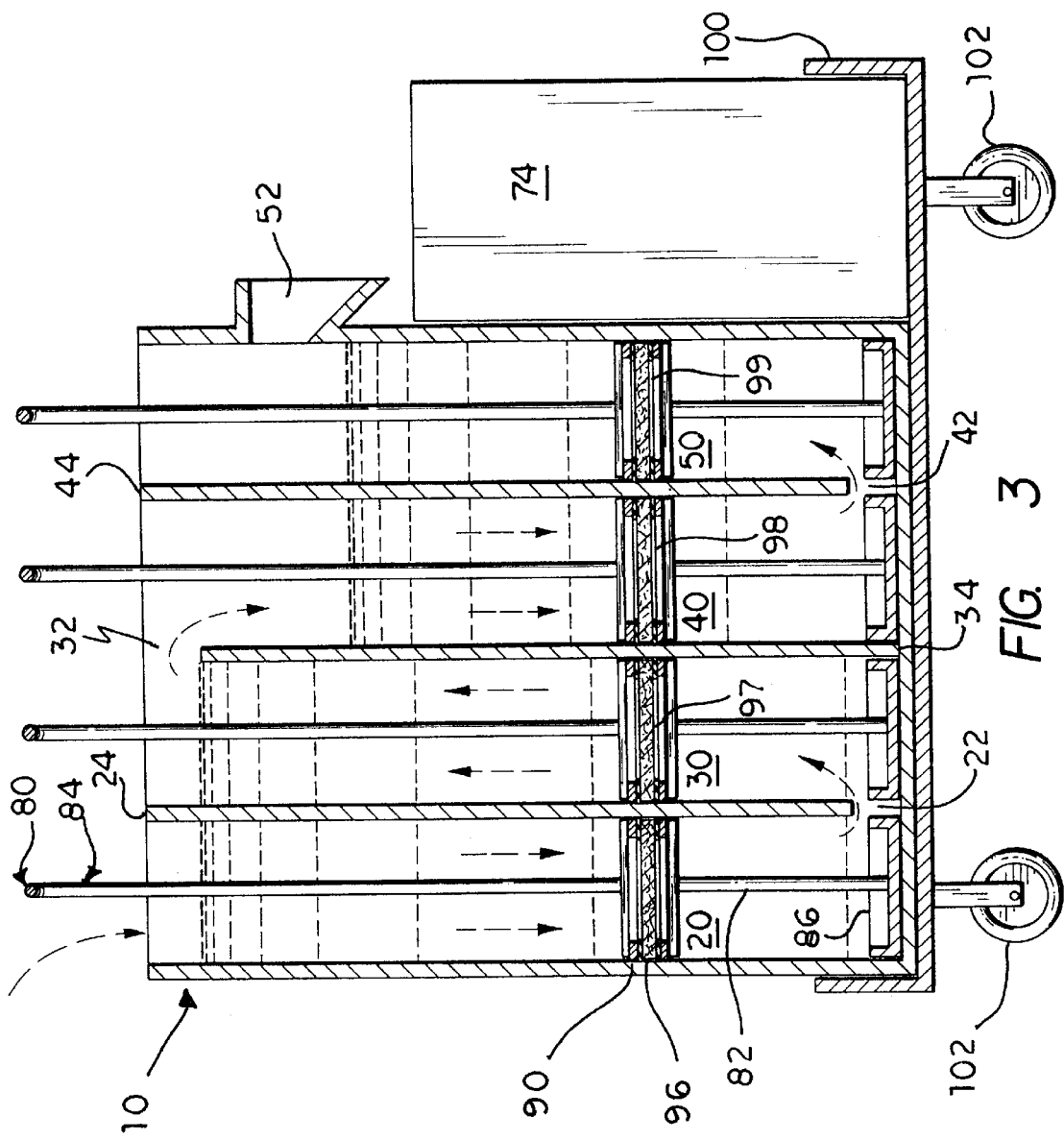
FIG. 3 is a cross-sectional view taken along lines 3—3 of FIG. 2.

The first embodiment of the present invention, as shown in FIGS. 1, 2 and 3, includes four chambers, 20, 30, 40, and 50, which are defined by a housing 14 and three weirs, 24, 34, and 44. Preferably both the housing 14 and the weirs, 24, 34, and 44, are made of a heat conductive material, such as sixteen (16) gauge stainless steel. By constructing the apparatus 10 of heat conductive material, the apparatus 10 will help to disperse the unwanted heat in the liquid to the surrounding atmosphere. The weirs, 24, 34, and 44, are welded to the sides of the housing 14. The housing 14 is mounted on a cart 100 which has four casters 102 mounted on the bottom thereof, with one caster mounted in each corner. The housing or the cart 100 may also be equipped with a handle (not shown) to make maneuvering of the cart loo easier. Preferably, the handle is either constructed of a material which has a low heat conductivity characteristic or it is insulated to prevent the user from being burned while moving the apparatus 10.

In the first embodiment of the present invention, the top of the housing 14, and therefore the top of the four chambers, 20, 30, 40, and 50, is open. Using an open system will help to disperse the unwanted heat in the liquid to the surrounding atmosphere.

The apparatus 10 is positioned under a machine 12 which is then drained of its debris-laden liquid, the liquid entering into the first chamber 20 and through the first filter element 96. The liquid is forced by manometric pressure and gravity to travel in a tortuous path through the remaining chambers, 30, 40, and 50, and around the three weirs, 24, 34, and 44. The cascading effect of the liquid flowing over weir 34 and into chamber 40 will also help to disperse the unwanted heat in the liquid to the surrounding atmosphere.

On its trip through the tortuous path, the liquid is forced through the four filter elements 96, 97, 98, and 99, which have progressively smaller pore sizes. Any large particles which are suspended in the liquid will settle at the bottom of each of the four chambers, 20, 30, 40, and 50, in the collection trays 86 which are part of the removable filter and collection units 80. Once the liquid reaches the fourth chamber 50, it may either collect in an overflow tank 74, which may be manually emptied back into the machine 12, or a pump 60 may be used to pump the cleansed liquid back into the machine 12 so that it may be reused. The inlet 64 to the pump 60 may be fitted with an optional fifth filter element (not shown). Any overflow liquid not returned by the pump will flow out chute 52 and be stored in an overflow tank 74 which is mounted on the cart 100.

It should be noted that in the first embodiment, but not in the second embodiment, the second passageway 32 must be positioned at a horizontal level below that of the open top portion of the first chamber 20. It should also be noted that if the second passageway 32 is positioned at a horizontal level above chute 52 in the fourth chamber 50, gravity will be able to force the liquid through the four chambers, 20, 30, 40, and 50, and into the overflow tank 74. In this configuration the pump 60 may be eliminated from the design.

The overflow tank 74 is preferably made of a heat conductive material, such as sixteen (16) gauge stainless steel which will help to disperse the unwanted heat in the liquid to the surrounding atmosphere. The overflow tank 74 is preferably removably mounted on the cart 100 and it includes a handle (not shown) which can be used to facilitate emptying and/or cleaning the tank 74. The handle is either constructed of a material which does not conduct heat as readily as stainless steel or it is insulated to prevent the user from being burned while moving the overflow tank 74.

The pump 60 is removably mounted to the housing 14 using a slotted bracket 62 which will allow for easy removal of the pump 60. The pump 60 is preferably fitted with a drip shield (not shown). The pump 60 is controlled with either a start-stop switch or variable speed drive, both of which are shown generically at 70 in FIG. 2. The pump 60 will also have a quick disconnect electrical fitting 72 to either the start-stop station or variable speed drive 70. The inlet 64 to the pump is located above the filter assembly 90 of the fourth chamber 50 so that the liquid is forced to travel through the final filter element 99 prior to being pump back to the machine 12, as is depicted in FIG. 1.

Alternatively, the removable unit 80 could be constructed so that the filter assembly 90 is below the inlet 64 in order to achieve the same result. The inlet 64 is also located below the chute 52 which leads to the overflow tank 74. Inlet tube 66 connects inlet 64 to the pump 60 and return tube 68 connects the pump 60 to the machine 12. The inlet tube 66 is preferably modified to include a valve (not shown) to isolate the pump 60 and to vary the flow rate of the liquid back to the machine 12.

Figure 4:
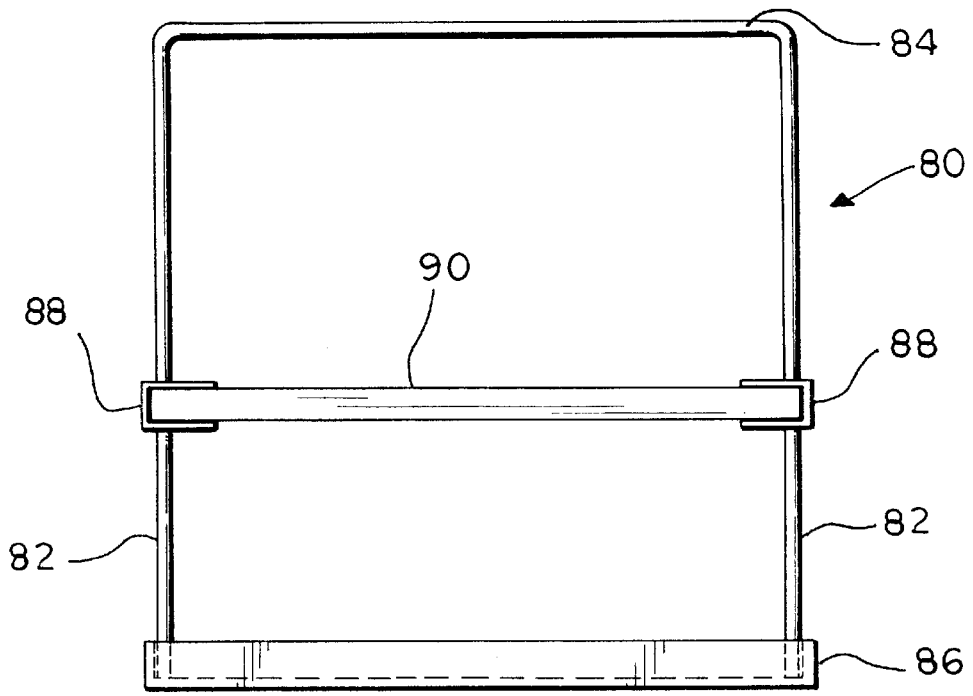
FIG. 4 is a side elevational view of a removable filtering and collecting unit which is inserted into each of the chambers of the device.

Each of the four filtration chambers, 20, 30, 40, and 50, houses a removable filter and collection unit 80, an example of which is best seen in FIG. 4. The removable filter and collection unit 80 includes a handle 84, a collection tray 86, a bracket 88, and a removable filter assembly 90. The handle 84 is constructed from a U-shaped stainless steel rod which is welded on either end to a bracket 88 made from sixteen (16) gauge stainless steel. Two straight stainless steel rods 82 are welded on either end to the brackets 88 and to the collection tray 86. The handle 84 of the removable unit 80 extends above the housing 14 so that it may be easy grasped and used to remove the removable unit 80 for cleaning.

Figure 5:
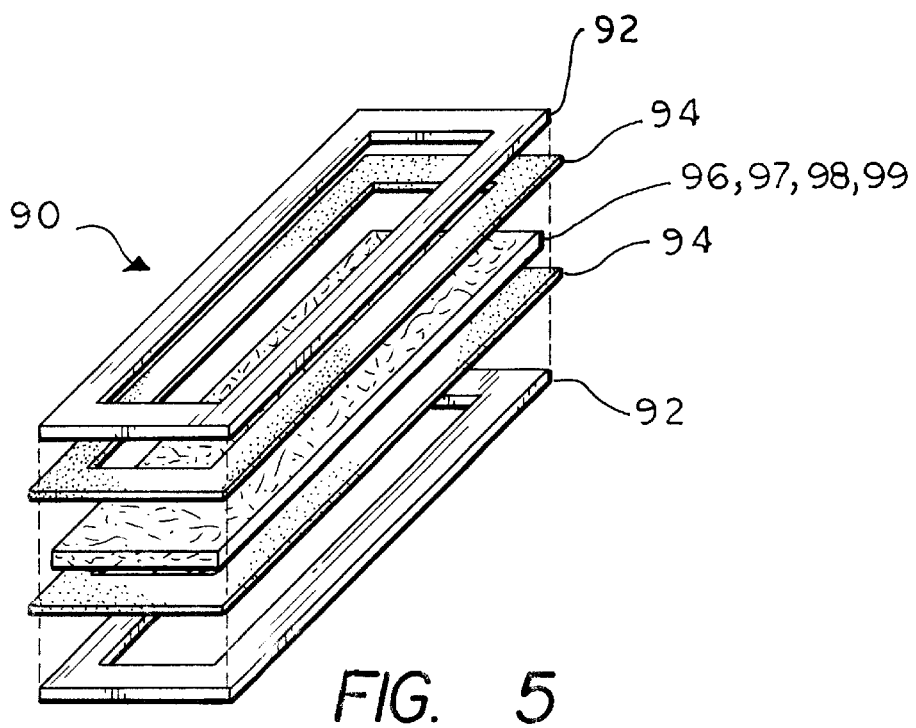
FIG. 5 is an exploded, perspective view of a filter assembly for use on a removable filtering and collecting unit.

The filter assembly 90 is constructed so that it may be slidably removed from the bracket 88 and cleaned or replaced by a new filter assembly before being replaced within the bracket 88. The filter assembly 90 includes a wire mesh filter element, 96, 97, 98, or 99, sandwiched between two gaskets 94, the combination of which is also sandwiched between two filter holders 92 as best seen in FIG. 5. Preferably, the filter assembly 90 should fit tightly within the brackets 88 so that a seal is formed between the gaskets 94 and the filter holders 92 and between the gaskets 94 and the filter elements, 96, 97, 98, and 99.

The filter holders 92 are preferably made of sixteen (16) gauge stainless steel while the gaskets 94 are preferably made of 1/16 inch thick neoprene rubber. The gaskets 94 are preferably made large enough that they extend beyond the outer edges of the filter holders 92 and so that the gaskets 94 will contact the inner walls of the chambers, 20, 30, 40, and 50. If the gaskets 94 contact the inner walls of the chambers, 20, 30, 40, and 50, they will form a seal to help prevent liquid from bypassing the filter assemblies 90. The filter holders 92 may have a series of round holes (not shown) punched through them such that one holes is centered on each of the short sides and seven holes are evenly spaced along each of the long sides. The gaskets 94 may be constructed with a matching series of round holes (not shown). The holes on the filter holders 92 and the gaskets 94 reduce the amount of material used to make these items and reduce the overall weight of these items while not significantly decreasing the structural integrity of these items.

All four filtration chambers, 20, 30, 40, and 50, have identical filter assemblies 90 except that the filter elements, 96, 97, 98, and 99 respectively, are of progressively smaller pore sizes. As the liquid travels from the first chamber 20 to the fourth chamber 50, smaller and smaller particles of debris in the liquid are being blocked by the filter elements, 96, 97, 98, and 99. In the preferred embodiment the first filter element 96 is a thirty (30) mesh filter, the second filter element 97 is a sixty (60) mesh filter, the third filter element 98 is a one hundred and twenty (120) mesh filter, and finally the fourth filter element 99 is a three hundred and twenty-five (325) mesh filter. The pore size of the filter elements, 96, 97, 98, and 99, may be varied depending on the needs of the user and depending on the particular application for which the apparatus 10 is being used.

The filter elements, 96, 97, 98, and 99, as well as the collection trays 86 should be cleaned on a regular basis in order to prevent the filter elements, 96, 97, 98, and 99, from becoming clogged to the point where liquid no longer flows through them. If the filter elements, 96, 97, 98, and 99, are not cleaned regularly, the manometric pressure and gravitational forces on the liquid may not be enough to force the liquid through the filter elements, 96, 97, 98, and 99.

An optional fifth filter (not shown) may be placed in the inlet 64 to the pump 60 if the user so desires. Alternatively, the filter may be integrated into the inlet tube 66. The optional filter can be used to help protect both the pump 60 and the machinery 12 from damage due to debris in the liquid. In the preferred embodiment the optional filter is made of a non-woven fiber matrix having an average pore size of five (5) microns.

Figure 6:
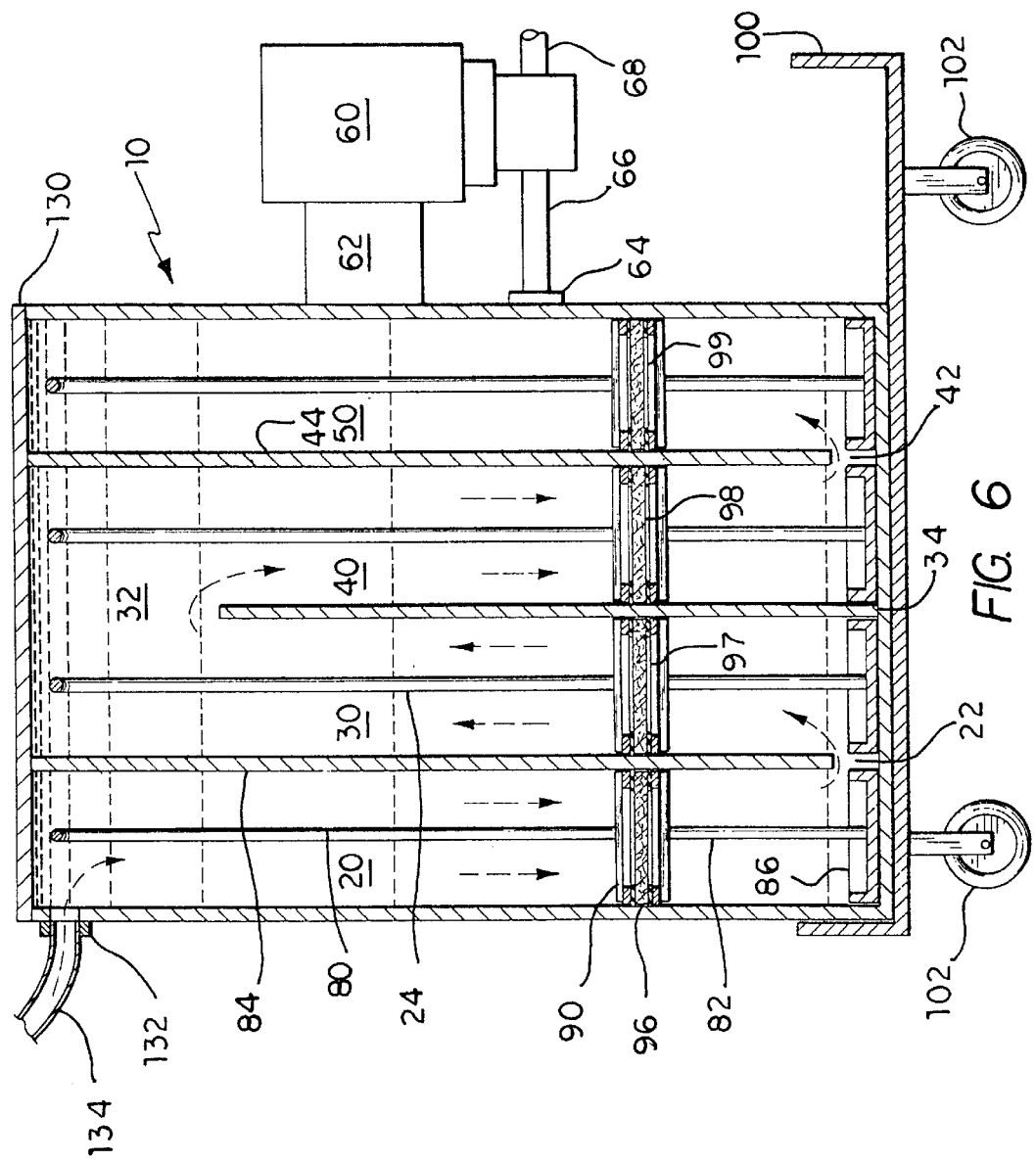
FIG. 6 is a cross sectional view of a second embodiment of an apparatus for filtering and cooling liquid, and having a closed system.

The present invention contemplates a second embodiment which is shown in FIG. 6. Except for the differences described below, the second embodiment is essentially the same in structure and operation as the first embodiment. In the second embodiment. the housing 14 and the first and third weirs, 24 and 44, are extended so that they are above the handles 84 of the removable units 80. A top wall 130 is mounted on top of the housing 14 so that a leak resistant seal is formed between the top wall 130 and the housing 14, the first weir 24, and the third weir 44, thereby creating a closed system. In order to further prevent any leakage from the apparatus 10, a gasket (not shown) is preferably placed where the top wall 130 meets the housing 14, the first weir 24, and the third weir 44. The top wall 130 is made of a heat conductive material, such as sixteen (16) gauge stainless steel which will help to disperse the unwanted heat in the liquid to the surrounding atmosphere.

The top wall 130 is removable so that the user may have access to the removable units for cleaning and maintenance purposes. One way this can be accomplished is by bolting the top wall 130 to the housing 14 and the first and third weirs, 24 and 44. In order to make opening of the top wall 130 easier, the top wall 130 is preferably hinged (not show) to the housing 14 and a handle (not shown) is position on the outside surface of the top wall 130. Preferably, the handle is either constructed of a material which does not conduct heat as readily as stainless steel or it is insulated to prevent the user from being injured, e.g., burned, while moving the apparatus 10.

In the second embodiment the liquid is feed into the first filtration chamber 20 through a tube 134 which runs from the machine 12 to an inlet orifice 132 located on the first chamber 20 above the first filter assembly 90. The pump 60 provides the force necessary to pull the liquid through the four filtration chambers, 20, 30, 40, and 50, and back up to the machine 12. A air bleeding valve (not shown) may be connected to the fourth chamber 50 in order to help the pump 60 to run more efficiently without the interference of air within the system. In the second embodiment there is no longer a need for an overflow tank so it is eliminated from the design. It should be noted that the size of the cart 100 may be reduced to better fit around the bottom of the housing 14, since the overflow tank 74 is no longer present on the cart 100.

It is to be understood that the present invention is not limited to the embodiments described above, but encompasses any and all embodiments within the scope of the following claims.

I claim:

1. An apparatus for filtering and cooling liquid comprising:

a first chamber having a top portion and a bottom portion, said first chamber having a first means for filtering and collecting particles from the liquid removably mounted therein, said top portion being open to the atmosphere, said open top portion receiving the liquid;

a second chamber having a top portion and a bottom portion, said second chamber laving a second means for filtering and collecting particles from the liquid removably mounted therein, said bottom portion of said second chamber being connected to said bottom portion of said first chamber by a first passageway, said top portion being open to the atmosphere;

a third chamber having a top portion and a bottom portion, said third chamber having a third means for filtering and collecting particles from the liquid removably mounted therein, said top portion of said third chamber being connected to said top portion of said second chamber by a second passageway, said top portion being open to the atmosphere, said second passageway being at a horizonral level below that of said open top portion of said first charaber;

a fourth chamber having a top portion and a bottom portion, said fourth chamber having a fourth means for filtering and collecting particles from the liquid removably mounted therein, said bottom portion of said fourth chamber being connected to said bottom portion of said third chamber by a third passageway, said top portion being open to the atmosphere, said fourth chamber having an opening at a horizontal level above that of said fourth means for filtering and collecting particles from the liquid and below that of said second passageway;

said first, second, third and fourth means for filtering and collecting particles from the liquid each comprise;

an elongated handle having a first end, a middle portion, and a second end, said first end acting as a means to gasp said means for filtering and collecting particles from the liquid;

a bracket affixed to said middle portion of said elongated handle; a tray affixed to said second end of said elongated handle such that said tray substantially covers and is adjacent to said bottom portion of said respective chamber; and a filter assembly removably mounted within said bracket such that substantially all of the flow of liquid is directed through said filter assembly;

a tank for receiving the faltered liquid exiting from said opening;

whereas a flow of liquid is created from said open top portion of said first chamber to said opening of said fourth chamber.

2. The apparatus for filtering and cooling liquid according to claim 1 wherein each of said filter assemblies comprise:

a pair of rigid filter holders each having an orifice therethrough, said filter holders being removably mounted within said bracket;

a pair of gaskets each having an orifice therethrough, said gaskets being oriented between said pair of filter holders, said gaskets having the ability to substantially prevent the flow of liquid from bypassing said filter element; and a porous filter element being oriented between said pair of gaskets.

3. The apparatus for filtering and cooling liquid according to claim 2 wherein:

said filter element of said first means for filtering and collecting particles from the liquid is a thirty (30) mesh filter;

said filter element of said second means for filtering and collecting particles from the liquid is a sixty (60) mesh filter;

said filter element of said third means for filtering and collecting particles from the liquid is a one hundred and twenty (120) mesh filter; and said filter element of said fourth means for filtering and collecting particles from the liquid is a three hundred and twenty-five (325) mesh filter.

4. The apparatus for filtering and cooling liquid according to claim 1 further comprising:

a platform having said first, second, third, and fourth chambers and said tank mounted thereon; and three wheels mounted on said platform, said wheels being capable of rotating about an axis substantially parallel to said platform and being adapted to traverse a supporting surface.

5. The apparatus for filtering and cooling liquid according to claim 4 wherein said first, second, third, and fourth chambers, said tank, said elongated handles, said brackets, said trays, and said filter holders are made of stainless steel.

6. An apparatus for filtering and cooling liquid from a source comprising:

a first chamber having a top portion and a bottom portion, said first chamber having a first means for filtering and collecting particles from the liquid removably mounted therein, said top portion having an inlet which receives the liquid;

a second chamber having a top portion and a bottom portion, said second chamber having a second means for filtering and collecting particles from the liquid removably mounted therein, said bottom portion of said second chamber being connected to said bottom portion of said first chamber by a first passageway;

a third chamber having a top portion and a bottom portion, said third chamber having a third means for filtering and collecting particles from the liquid removably mounted terein, said top portion of said third chamber being connected to said top portion of said second chamber by a second passageway;

a fourth chamber having a top portion and a bottom portion, said fourth chamber baving a fourth means for filtering and collecting particles from the liquid removably mounted therein, said bottom portion of said fourth chamber being connected to said bottom portion of said third chamber by a third passageway, said fourth chamber having an outlet at a horizontal level above said fourth means for filtering and collecting particles from the liquid;

said first, second, third, and fourth means for filtering and collecting particles from the liquid each comprise:

an elongated handle having a first end, a middle portion and a second end, said first end acting as a means to grasp said means for filtering and collecting particles from the liquid;

a bracket affixed to said middle portion of said elongated handle; a tray affixed to said second end of said elongated handle such that said tray substantially covers and is adjacent to said bottom portion of said respective chamber; and a filter assembly removably mounted within said bracket such that substantially all of the flow of liquid is directed through said filter assembly;

a fluid pump having an inlet port and an outlet port;

a first hose having a first end and a second end, said first end being connected to said outlet of said fourth chamber and said second end being connected to said inlet port cf said pump; and a second hose having a first end and a second end, said first end being connected to said outlet port of said pump and said second end being adapted to return the liquid to the source;

whereas a flow of liquid is created from said inlet of said first chamber to said cutlet of said fourth chamber.

7. The apparatus for filtering and cooling liquid from a source according to claim 6 wherein each of said filter assemblies comprise:

a pair of rigid filter holders each having an orifice therethrough, said filter holders being removably mounted within said bracket;

a pair of gaskets each having an orifice therethrough, said gaskets being oriented between said pair of filter holders, said gaskets having the ability to substantially prevent the flow of liquid from bypassing said filter element; and a porous filter element being oriented between said pair of gaskets.

8. The apparatus for filtering and cooling liquid from a source according to claim 7 wherein:

said filter element of said first means for filtering and collecting particles from the liquid is a thirty (30) mesh filter;

said filter element of said second means for filtering and collecting particles from the liquid is a sixty (60) mesh filter;

said filter element of said third means for filtering and collecting particles from the liquid is a one hundred and twenty (120) mesh filter; and said filter element of said fourth means for filtering and collecting particles from the liquid is a three hundred and twenty-five (325) mesh filter.

9. The apparatus for filtering and cooling liquid from a source according to claim 6 wherein said fluid pump has a fifth means for filtering and collecting particles from the liquid located between said outlet of said fourth chamber and said inlet port of said fluid pump.

10. The apparatus for filtering and cooling liquid from a source according to claim 9 wherein said fifth means for filtering and collecting particles from the liquid is made of a fiber matrix having an average pore size of about five (5) microns.

11. The apparatus for filtering and cooling liquid from a source according to claim 6 further comprising:

a platform having said first, second, third, and fourth chambers mounted thereon, said pump being mounted on said fourth chamber; and three wheels mounted on said platform, said wheels being capable of rotating about an axis substantially parallel to said platform and being adapted to traverse a supporting surface.

12. The apparatus for filtering and cooling liquid from a source according to claim 6:

said second passageway being at a horizontal level below that of said inlet of said first chamber; and said outlet of said fourth chamber being at a horizontal level below that of said second passageway.

13. The apparatus for filtering and cooling liquid from a source according to claim 12 wherein:

said top portions of said first, second, third, and fourth chambers are exposed to the atmosphere;

said fourth chamber having an opening at a horizontal level above that of said fourth means for filtering and collecting particles from the liquid; and there further being a tank for receiving any filtered liquid exiting from said opening.

14. The apparatus for filtering and cooling liquid according to claim 13 wherein said first, second, third, and fourth chambers, said tank, said elongated handles, said brackets, said trays, and said filter holders are made of stainless steel.

15. The apparatus for filtering and cooling liquid from a source according to claim 12 wherein said top portions of said first, second, third, and fourth chambers are substantially concealed from the atmosphere.

16. The apparatus for filtering and cooling liquid from a source according to claim 15 further comprising means for bleeding gas from said first, second, third, and fourth chambers.

17. The apparatus for filtering and cooling liquid according to claim 16 wherein said first, second, third, and fourth chambers, said elongated handles, said brackets, said trays, and said filter holders are made of stainless steel.

* * * * *